United States Patent [19]

Yamaguchi

[11] Patent Number: 5,791,427

[45] Date of Patent: Aug. 11, 1998

[54] HYBRID VEHICLE

[75] Inventor: Kozo Yamaguchi, Aichi-ken, Japan

[73] Assignee: Kabushikikaisha Equos Research, Japan

[21] Appl. No.: 556,072

[22] Filed: Nov. 2, 1995

[30] Foreign Application Priority Data

Feb. 3, 1995 [JP] Japan ................... 7-017274

[51] Int. Cl.$^6$ ................................................. B60K 6/04
[52] U.S. Cl. ................................. 180/65.3; 180/165
[58] Field of Search ........................ 180/65.2, 65.3, 180/65.6, 65.8, 179, 165; 310/121, 123, 102 R

[56] References Cited

U.S. PATENT DOCUMENTS

| | | | |
|---|---|---|---|
| 1,402,250 | 1/1922 | Pieper | 180/65.2 |
| 1,817,820 | 8/1931 | Higley | 180/65.2 |
| 2,506,809 | 5/1950 | Nims | 180/65.2 |
| 2,672,566 | 3/1954 | Heins | 310/123 |
| 2,939,973 | 6/1960 | Crane et al. | 310/121 |
| 3,192,421 | 6/1965 | Sayler | 310/102 R |
| 5,003,483 | 3/1991 | Hedström | 180/179 |
| 5,343,780 | 9/1994 | McDaniel et al. | 180/179 |
| 5,343,970 | 9/1994 | Severinsky | 180/65.6 |
| 5,562,566 | 10/1996 | Yang | 180/65.2 |
| 5,588,498 | 12/1996 | Kitada | 180/65.8 |

*Primary Examiner*—Brian L. Johnson
*Assistant Examiner*—Frank Vanaman
*Attorney, Agent, or Firm*—Lorusso & Loud

[57] ABSTRACT

A hybrid vehicle is provided which can produce a decelerating force without detriment to drive quality. The hybrid vehicle includes an internal combustion engine, an electromechanical unit, an electric motor, a decelerating operation detecting unit for detecting that a decelerating operation has been performed, a differential gear unit having at least a first gear element connected to the electromechanical unit, a second gear element connected to an output shaft and a third gear element connected to the internal combustion engine, an engine controller for bringing the internal combustion engine into a non-driving state when it is detected by the decelerating operation detecting unit that a decelerating operation has been performed. When it is detected by the decelerating operation detecting unit that a decelerating operation has been performed, the internal combustion engine is brought into the non-driving state, and the electromechanical unit control unit controls the electromechanical unit so as to compulsorily rotate the internal combustion engine.

21 Claims, 15 Drawing Sheets

HYBRID VEHICLE

BACKGROUND OF THE INVENTION

1. Field of the Invention

The present invention relates to a hybrid vehicle.

2. Description of the Related Art

Conventional hybrid vehicles can be categorized as either series hybrid vehicles or parallel hybrid vehicles. In series hybrid vehicles, rotation generated by driving an internal combustion engine is transmitted to a generator to drive the generator, and electrical power output by the generator is converted into direct current to charge a battery. Electrical power output by the battery is converted into alternating current to drive an electric motor. In parallel hybrid vehicles, the internal combustion engine and the electric motor are connected with each other through a clutch. When the hybrid vehicle starts, the electric motor is driven. After that, the clutch is brought into an engaged state and the internal combustion engine is operated to make the hybrid vehicle travel. The electric motor is also operated during high accelerations. A hybrid vehicle also exists in which the features of series hybrid vehicles and parallel hybrid vehicles are combined.

In these hybrid vehicles, energy which is generated during deceleration of the vehicle is converted into regenerative current by the electric motor and fed to a battery serving as an electricity accumulating means to charge the battery. When such a regenerative state continues for a long period of time, such as due to traveling of the vehicle on a downhill road, the regenerative current exceeds the current capacity which can be accumulated in the battery, i.e., a predetermined limit on accumulation of electricity (hereinafter referred to as "chargeable amount"). In such a case, the excessive regenerative current which cannot be accumulated in the battery is converted into heat by a radiation resistor, thereby consuming the excessive regenerative current.

However, since the conventional hybrid vehicle requires a large radiation resistor to convert regenerative current into heat, the weight and size of the hybrid vehicle are increased.

Since the chargeable amount of the battery varies depending on the battery voltage, the amount of electricity remaining in the battery (hereinafter referred to as "battery residual amount"), the temperature of the battery and the like, the amount of charge, i.e., the value of the regenerative current must be changed. Accordingly, even when a brake pedal is depressed by a constant amount, the degree of deceleration of the hybrid vehicle varies in accordance with the state of the battery, which deteriorates the drive quality.

SUMMARY OF THE INVENTION

An object of the present invention is to solve the above-described problems of conventional hybrid vehicles and to provide an improved hybrid vehicle which can produce a force to decelerate the vehicle (hereinafter referred to as a "decelerating force") when the regenerative current exceeds a chargeable amount of the electricity accumulating means, wherein the production of a decelerating force is performed without using additional means such as a radiation resistor while sustaining the drive quality of the hybrid vehicle.

To achieve the above object, a hybrid vehicle according to the present invention comprises an internal combustion engine, an electromechanical unit into which the rotation of the internal combustion engine is input, an electric motor which is driven by current supplied thereto, decelerating operation detecting means for detecting that a decelerating operation has been performed, a differential gear unit having at least a first gear element connected to the electromechanical unit, a second gear element connected to the output shaft and a third gear element connected to the internal combustion engine, and an engine controller for bringing the internal combustion engine into a non-driving state when it is detected by the decelerating operation detecting means that a decelerating operation has been performed.

The hybrid vehicle also has electromechanical unit control means which compulsorily rotates the internal combustion engine by controlling the electromechanical unit when the internal combustion engine is in the non-driving state.

In this case, when it is detected by the decelerating operation detecting means that a decelerating operation has been performed, the internal combustion engine is brought into the non-driving state by the engine controller.

The electromechanical unit control means controls the electromechanical unit so as to compulsorily rotate the internal combustion engine via the third gear element.

As a result, a mechanical loss due to the rotation of the internal combustion engine which is in the non-driving state, i.e., an engine brake torque is generated, so that a decelerating force is applied to the hybrid vehicle. Therefore, additional means such as a radiating resistor becomes unnecessary so that the weight and size of the hybrid vehicle can be decreased.

When the engine brake torque is generated, the internal combustion engine serves as a load so that heat is generated in the internal combustion engine. However, since the internal combustion engine has a cooling unit such as a radiator to discharge the heat, it is unnecessary to provide a separate cooling unit.

Also, since the rotational speed of the internal combustion engine can be controlled by controlling the electromechanical unit, the engine brake torque can be varied.

In another aspect of the present invention, the hybrid vehicle is further provided with an electricity accumulating means, and a chargeable amount detecting unit for detecting the chargeable amount of the electricity accumulating means.

Further, the electromechanical unit control means compares an electricity accumulation amount corresponding to the regenerative current generated by the electric motor with the chargeable amount.

When the electricity accumulation amount exceeds the chargeable amount, the electromechanical unit control means controls the electromechanical unit to compulsorily rotate the internal combustion engine.

In this case, when it is detected by the decelerating operation detecting means that a decelerating operation has been performed, the internal combustion engine is brought into the non-driving state by the engine controller, and a regenerative current is generated by the electric motor and is accumulated in the electricity accumulating means.

Further, the electromechanical unit control means compares the electricity accumulation amount with the chargeable amount of the electricity accumulating means detected by the chargeable amount detecting unit, and when the electricity accumulation amount exceeds the chargeable amount, the electromechanical unit control means controls the electromechanical unit to compulsorily rotate the internal combustion engine.

Since the electromechanical unit is controlled in accordance with the difference between the regenerative current and the chargeable amount, a decelerating force can be applied to the hybrid vehicle without detriment to the drive quality thereof even when the chargeable amount of the battery varies due to changes in the conditions of the battery such as the voltage, the residual amount of electricity, and the temperature of the electricity accumulating means.

In another embodiment of a hybrid vehicle according to the present invention, the internal combustion engine and the electromechanical unit are connected to the output shaft via a differential gear unit, and the output shaft and the electric motor are connected with each other.

In still another embodiment of a hybrid vehicle according to the present invention, the decelerating operation detecting means detects depressing of a brake pedal.

In this case, when the brake pedal is depressed, the internal combustion engine is brought into the non-driving state.

In still another embodiment of a hybrid vehicle according to the present invention, the decelerating operation detecting means detects a decelerating operation by operating a shift lever.

In this case, when the shift lever is operated, the internal combustion engine is brought into the non-driving state.

In still another embodiment of a hybrid vehicle according to the present invention, the electromechanical unit has a stator, a rotor, and a brake which is disposed between the rotor and a casing to selectively fix the rotor.

In this case, an engine brake torque can be generated by operating the brake.

In still another embodiment of a hybrid vehicle according to the present invention, the electromechanical unit control means compulsorily rotates the internal combustion engine by controlling the electromechanical unit based on the difference between an allowable regenerative torque and the brake torque generated by a deceleration unit. The allowable regenerative torque indicates the amount of the regenerative current which can be accumulated in the electricity accumulating means.

In this case, it can be determined based on the difference between the allowable regenerative torque and the brake torque whether or not the electricity accumulation amount exceeds the chargeable amount.

In yet another embodiment of a hybrid vehicle according to the present invention, the electromechanical unit control means compulsorily rotates the internal combustion engine by controlling the electromechanical unit based on the vehicle speed.

In a further embodiment of a hybrid vehicle according to the present invention, the electromechanical unit control means operates the above-described brake to generate an engine brake torque.

In yet another aspect of the present invention, a hybrid vehicle comprises an internal combustion engine, an electromechanical unit into which rotation of the internal combustion engine is input, an output shaft connected to the internal combustion engine via the electromechanical unit, an electric motor which is connected to the output shaft and is driven by current supplied thereto, a decelerating operation detecting means for detecting that a decelerating operation has been performed, an engine controller for bringing the internal combustion engine into a non-driving state when it is detected by the decelerating operation detecting means that a decelerating operation has been performed, and an electromechanical unit control means which compulsorily rotates the internal combustion engine by controlling the electromechanical unit when the internal combustion engine is in the non-driving state.

In yet another embodiment of a hybrid vehicle according to the present invention, the electromechanical unit has a stator, a rotor, and a clutch which is disposed between the stator and the rotor to selectively establish a mechanical connection between the stator and the rotor.

In this case, an engine brake torque can be generated by operating the clutch.

BRIEF DESCRIPTION OF THE DRAWINGS

The structure and features of the hybrid vehicle according to the present invention will be readily appreciated as the same becomes better understood by referring to the accompanying drawings, in which.

DESCRIPTION OF PREFERRED EMBODIMENTS

Embodiments of the present invention will now be described in detail with reference to the drawings.

Figure 1:
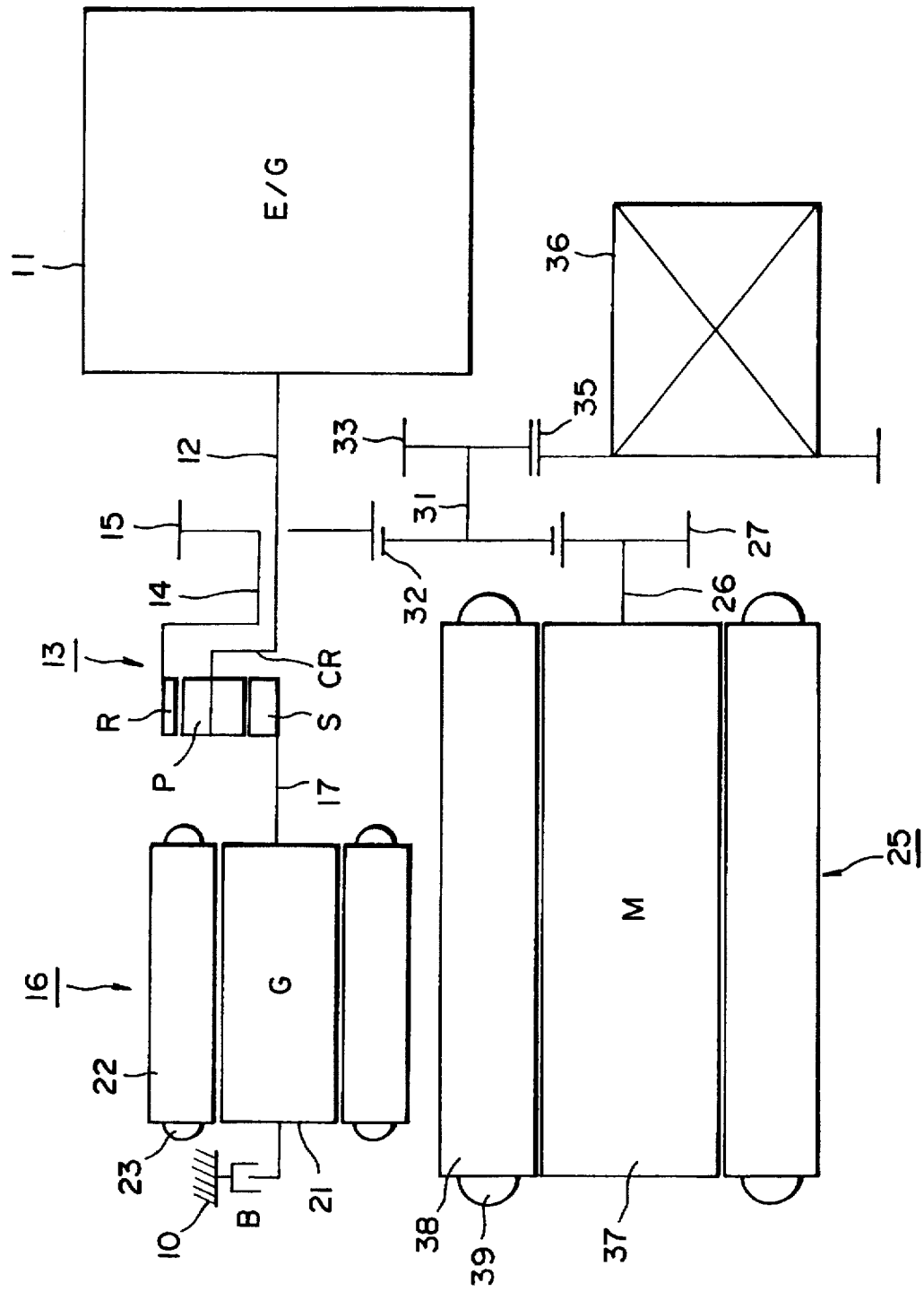
FIG. 1 is a schematic view of a drive apparatus of a hybrid vehicle according to the first embodiment of the present invention.

In FIG. 1, numeral 11 denotes an internal combustion engine (E/G) disposed on a first axis. The internal combustion engine 11 is connected to an unillustrated cooling unit such as a radiator so that the heat generated in the internal combustion engine 11 can be discharged from the cooling unit. Numeral 12 denotes an output shaft which is disposed on the first axis and outputs the rotation generated by operating the internal combustion engine 11. Numeral 13 denotes a planetary gear unit which is disposed on the first axis and serves as a differential gear unit for changing the speed of the rotation input through the output shaft 12. Numeral 14 denotes an output shaft which is disposed on the first axis and to which rotation having changed speed is output from the planetary gear unit 13. Numeral 15 denotes a first counter drive gear which is disposed on the first axis and is fixed to the output shaft 14. Numeral 16 denotes a generator/motor (G) which is disposed on the first axis and connected to the planetary gear unit 13 via a transmission shaft 17 to serve as an electromechanical unit. In the present embodiment, the generator/motor 16 is used as an electromechanical unit. However, a generator may be used as the electromechanical unit.

The output shaft 14 has a sleeve-like shape, and disposed to surround the output shaft 12. The first counter drive gear 15 is disposed between the planetary gear unit 13 and the internal combustion engine 11.

The planetary gear unit 13 includes a sun gear S serving as a first gear element, a pinion P meshed with the sun gear S, a ring gear R which is meshed with the pinion P and serves as a second gear element, and a carrier CR which rotatably supports the pinion P and serves as a third gear element.

The sun gear S is connected to the generator 16 via the transmission shaft 17. The ring gear R is connected to the first counter drive gear 15 via the output shaft 14. The carrier CR is connected to the internal combustion engine 11 via the output shaft 12.

The generator/motor 16 has a rotor 21 which is coupled to the transmission shaft 17 and is rotatably disposed, a stator 22 disposed to surround the rotor 21, and a winding 23 applied to the stator 22. The generator/motor 16 generates an electrical power by using the rotation transmitted through the transmission shaft 17. The winding 23 is connected to an unillustrated battery serving as electricity accumulating means so as to supply the battery with current for accumulation. The generator/motor 16 is provided with a brake B disposed between the rotor 21 and the casing 10. When the brake B is brought into an engaged state, the rotor 21 can be selectively fixed to the casing 10.

Numeral 25 denotes an electric motor (M) which is disposed on a second axis parallel to the first axis. Numeral 26 denotes an output shaft which is disposed on the second axis and to which the rotation of the electric motor 25 is output. Numeral 27 denotes a second counter drive gear which is disposed on the second axis and fixed to the output shaft 26. The electric motor 25 includes a rotor 37 which is fixed to the output shaft 26 for rotation therewith, a stator 38 disposed to surround the rotor 37, and a winding 39 applied to the stator 38.

The electric motor 25 generates a torque by using current supplied to the winding 39. For this purpose, the winding 39 is connected to the battery to receive current therefrom. Also, when the hybrid vehicle is in a decelerating state, the electric motor 25 receives rotation from unillustrated drive wheels and generates a regenerative current, which is then supplied to the battery to be accumulated therein.

To rotate the drive wheels in the same direction as the internal combustion engine 11, a counter shaft 31 is disposed on a third axis parallel to the first and second axes, and a counter driven gear 32 is fixed to the counter shaft 31. Also, the first counter drive gear 15 and the second counter drive gear 27 are meshed with the counter driven gear 32, so that the rotation of the first counter drive gear 15 and the rotation of the second counter drive gear 27 are transmitted to the counter driven gear 32 while their rotational directions are inverted.

Further, a differential pinion gear 33 is fixed to the counter shaft 31. The differential pinion gear 33 has teeth the number of which is fewer than that of the teeth of the counter driven gear 32.

A differential ring gear 35 is disposed on a fourth axis parallel to the first, second and third axes, and the differential ring gear 35 is meshed with the differential pinion gear 33. A differential unit 36 is coupled to the differential ring gear 35. As a result, the rotation transmitted to the differential ring gear 35 is transmitted to the drive wheels via the differential unit 36 while providing a differential action.

As described above, not only the rotation generated by the internal combustion engine 11 but also the rotation generated by the electric motor 25 can be transmitted to the counter driven gear 32. Accordingly, the hybrid vehicle can be operated in an engine drive mode in which only the internal combustion engine 11 is operated, a motor drive mode in which only the motor 25 is operated, and an engine/motor drive mode in which the internal combustion engine 11 and the electric motor 25 are both operated.

Also, the rotational speed of the transmission shaft 17 is controlled by controlling the generator/motor 16, whereby the internal combustion engine 11 and the electric motor 25 are operated most efficiently. Moreover, the internal combustion engine 11 can be started by the generator/motor 16.

Since the internal combustion engine 11 and the electric motor 25 are disposed on different axes, the axial length of the drive apparatus can be reduced. When the drive apparatus is mounted on an FF type hybrid vehicle, the maximum steering angle becomes sufficiently large so that the minimum turning radius can be decreased.

The rotation of the internal combustion engine 11 is output to the output shaft 12 and is then transmitted to the first counter drive gear 15, while the rotation of the electric motor 25 is output to the output shaft 26 and is then transmitted to the second counter drive gear 27. Therefore, the gear ratio between the first counter drive gear 15 and the counter driven gear 32 can be made different from the gear ratio between the second counter drive gear 27 and the counter driven gear 32. Accordingly, the capacities of the internal combustion engine 11 and the electric motor 25 can be freely changed in a wide range, which facilitates the design of the drive apparatus.

Next, a control circuit of the hybrid vehicle having the above-described structure will be described with reference to FIG. 2.

Figure 2:
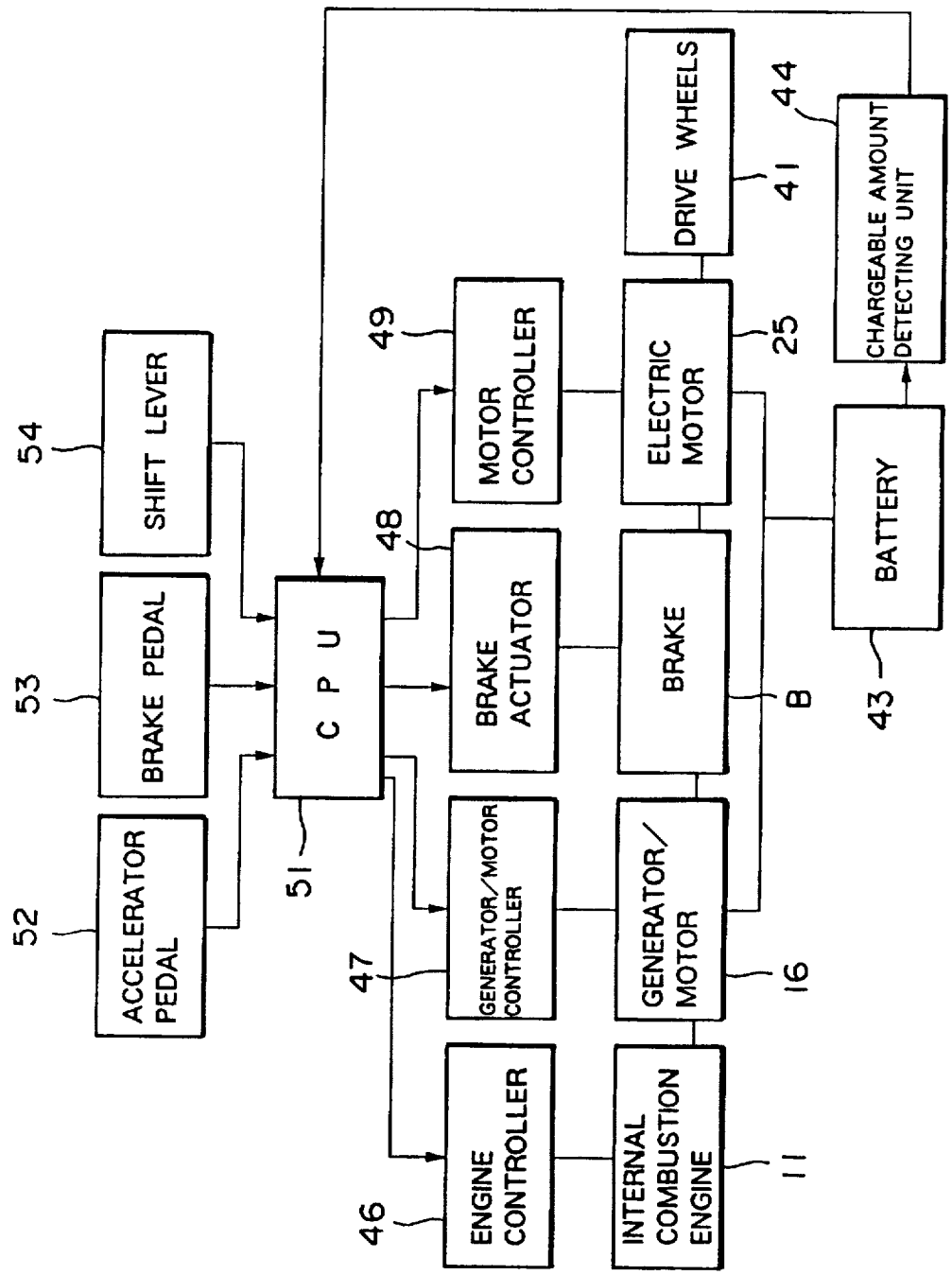
FIG. 2 is a block diagram showing a control circuit of the hybrid vehicle according to the first embodiment of the present invention.

In FIG. 2, numeral 11 denotes the internal combustion engine, numeral 16 denotes the generator/motor, numeral 25 denotes the electric motor, reference symbol B denotes the brake which is disposed between the rotor 21 and the casing 10 of the generator/motor 16 (FIG. 1) and which engages and releases the rotor 21. When the brake B is operated, the rotor 21 of the generator/motor 16 is selectively fixed to the casing 10 to generate an engine brake torque.

Numeral 41 denotes the drive wheels, numeral 43 denotes a battery serving as an electricity accumulating means, numeral 44 denotes a chargeable amount detecting unit for detecting the chargeable amount of the battery 43. The chargeable amount is detected based on the voltage of the battery, the battery residual amount, the temperature of the battery, and the like.

Numeral 46 denotes an engine controller which controls the internal combustion engine 11 to bring it into an driving state or a non-driving state. Numeral 47 denotes a generator/motor controller which controls the generator/motor 16 and which serves as an electromechanical unit control means. Numeral 48 denotes a brake actuator for operating the brake B. Numeral 49 denotes a motor controller which controls the electric motor 25. The internal combustion engine 11 can be brought into the non-driving state by turning off an unillustrated ignition switch, or by decreasing the throttle opening to zero.

Numeral 51 denotes a CPU (ECU) for controlling the entire operation of the hybrid vehicle. The CPU 51 receives as input an amount of depression of an accelerator pedal 52 (hereinafter referred to as an "accelerator depression amount") , an amount of depression of a brake pedal 53 (hereinafter referred to as a "brake depression amount"), a shift position of a shift lever 54, and a chargeable amount detected by the chargeable amount detecting unit 44, and outputs an accelerator signal indicating the accelerator depression amount, a brake signal indicating whether the brake pedal 53 is depressed and also indicating the brake depression amount, and a shift position signal indicating a shift position selected by the shift lever 54 so as to control the engine controller 46, the generator/motor controller 47, the brake actuator 48, and the motor controller 49.

Next, operation of the hybrid vehicle having the above-described structure will be described with reference to FIGS. 3–5.

Figure 3:
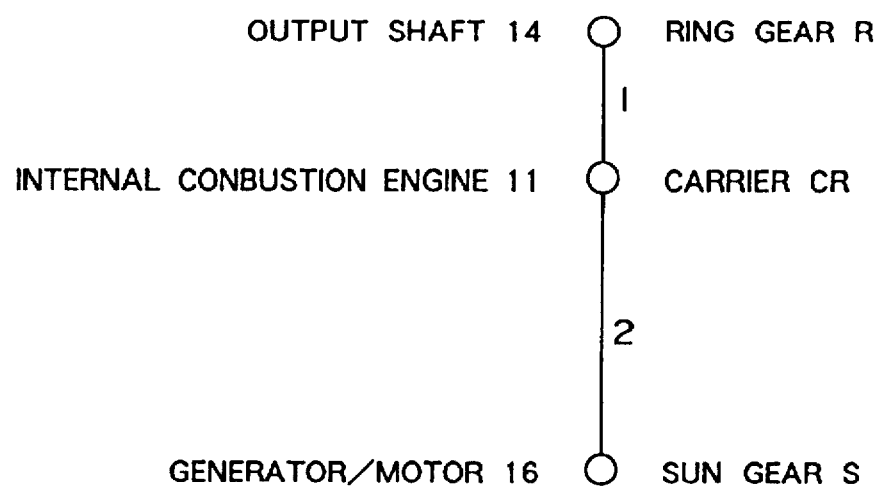
FIG. 3 is a diagram illustrating operation of a planetary gear unit used in the first embodiment of the present invention.

In the present embodiment, as shown in FIG. 3, the number of the teeth of the ring gear R of the planetary gear unit 13 (FIG. 1) is selected to be two times the number of the teeth of the sun gear S. Therefore, the rotational speed NG of the generator/motor 16 connected to the sun gear S via the transmission shaft 17 (hereinafter referred to as a "generator/motor rotational speed") can be expressed as follows:

$$NG = 3NE - 2NOUT,$$

wherein NE is the rotational speed of the internal combustion engine 11 connected to the carrier CR (hereinafter referred as an "engine rotational speed"), and NOUT is the rotational speed of the output shaft 14 connected to the ring gear R (hereinafter referred to as an "output rotational speed"). Also, when the torque output from the planetary gear unit 13 (hereinafter referred to as an "output torque") is represented by TOUT, the torque out-put from the internal combustion engine 11 (hereinafter referred to as an "engine torque") is represented by TE, and the torque output from the generator/motor 16 (hereinafter referred to as a "generator/motor torque") is represented by TG, the following relationship is satisfied:

$$TE:TOUT:TG=3:2:1.$$

Figure 4:
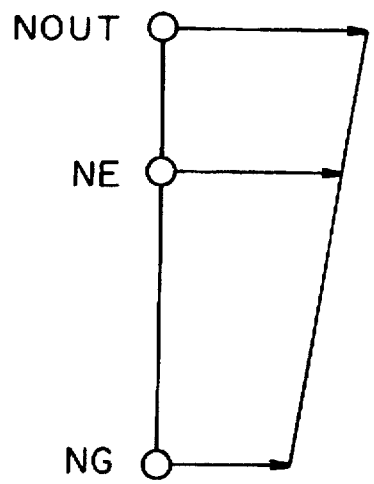
FIG. 4 is a velocity diagram in the first embodiment of the present invention when the hybrid vehicle is in an ordinary traveling state.
Figure 5:
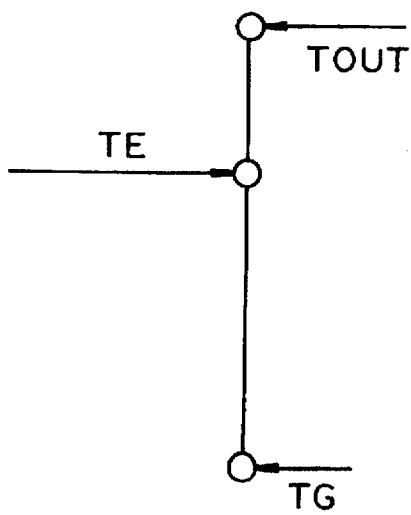
FIG. 5 is a torque diagram in the first embodiment of the present invention when the hybrid vehicle is in the ordinary traveling state.

When the hybrid vehicle is in an ordinary traveling state, the ring gear R, the carrier CR and the sun gear S are all rotated in the forward direction, and each of the output rotational speed NOUT, the engine rotational speed NE and the generator/motor rotational speed NG becomes positive as shown in FIG. 4.

The engine torque TE is input to the carrier CR, and this torque is received by the reaction forces of the first counter drive gear 15 and the generator/motor 16. As a result, the output torque TOUT is output from the ring gear R to the output shaft 14 and the generator/motor torque TG is output from the sun gear S to the transmission shaft 17.

The engine torque TE is divided into the output torque TOUT and the generator/motor torque TG in accordance with the torque ratio which is determined by the number of the teeth of the planetary gear unit 13. In the torque diagram, the sum of the output torque TOUT and the generator/motor torque TG is equal to the engine torque TE.

Next, an explanation will be given of the operation of the hybrid vehicle with the internal combustion engine 11 entering into the non-driving state and the generator/motor 16 is not controlled, while the hybrid vehicle is traveling. The "non-driving state" means not only a state in which no drive force is generated (for example, the supply of fuel is stopped) but also a state such as an idle state in which the drive force is smaller compared to the case where the vehicle is in a traveling state.

Figure 6:
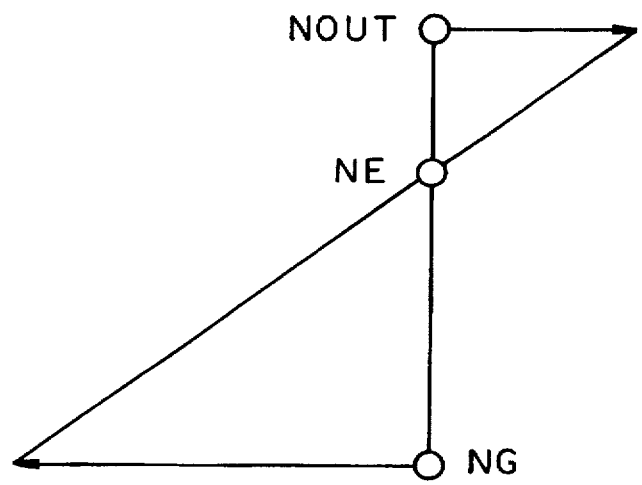
FIG. 6 is a first velocity diagram in the first embodiment of the present invention when the internal combustion engine is in the non-driving state (non-drive mode)
Figure 7:
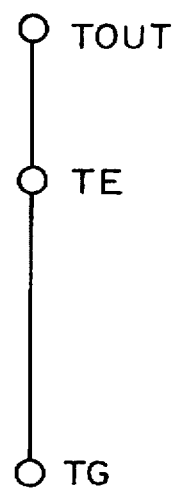
FIG. 7 is a first torque diagram in the first embodiment of the present invention when the internal combustion engine is in the non-driving state.

In this case, the electric motor 25 (FIG. 2) receives the rotation of the drive wheels 41 and generates a regenerative current. The ring gear R (FIG. 1) also receives the rotation of the drive wheels 41 and rotates in the forward direction, while the carrier CR is stopped. As a result, the sun gear S is rotated in the reverse direction. Accordingly, the output rotational speed NOUT becomes positive, the engine rotational speed NE becomes zero, and the generator/motor rotational speed NG becomes negative, as shown in FIG. 6.

Since the engine rotational speed NE is zero, no engine torque TE is generated so that no torque is applied to the ring gear R, the carrier CR, and the sun gear S. Accordingly, the output torque TOUT and the generator/motor torque TG are both zero.

In this state, the electric motor 25 generates a regenerative current. However, since the generator/motor 16 is not controlled, no engine brake torque is generated. Also, excessive regenerative current cannot be consumed.

Figure 8:
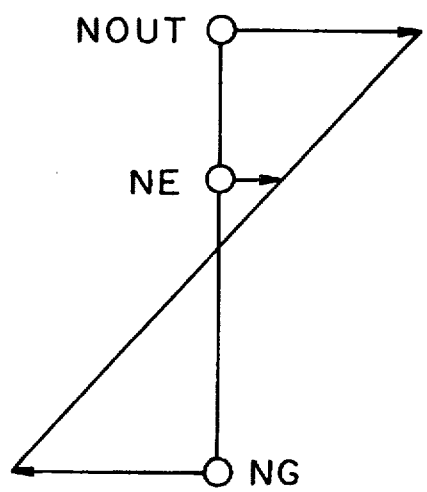
FIG. 8 is a second velocity diagram in the first embodiment of the present invention when the internal combustion engine is in the non-driving state.

Next, an explanation will be given, with reference to FIGS. 8 and 9, of the operation of the hybrid vehicle in a state in which the internal combustion engine 11 is brought into the non-driving state and the generator/motor 16 is controlled to generate a reaction force, while the hybrid vehicle is traveling.

In this case, the electric motor 25 (FIG. 2) receives the rotation of the drive wheels 41 and generates a regenerative current. The ring gear R (FIG. 1) also receives the rotation of the drive wheels 41 and rotates in the forward direction so that the sun gear S is rotated in the reverse direction. Accordingly, the generator/motor 16 generates electricity. Since the generator/motor 16 is controlled such that its rotational speed becomes lower than that in the state shown in FIG. 6, the rotational speed of the internal combustion engine 11 is increased by an amount corresponding to the amount of decrease in the rotational speed of the generator/motor 16 so that the carrier CR is rotated in the forward direction. Accordingly, the output rotational speed NOUT and the engine rotational speed NE become positive, and the generator/motor rotational speed NG becomes negative, as shown in FIG. 8.

Figure 9:
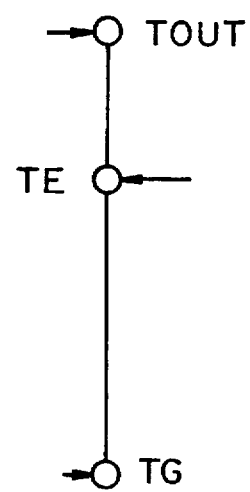
FIG. 9 is a second torque diagram in the first embodiment of the present invention when the internal combustion engine is in the non-driving state.

At this time, the engine torque TE acts in the leftward direction in FIG. 9, and acts on the planetary gear unit 13 as an engine brake torque. Since the engine rotational speed NE is small at this time, the engine brake torque is also small, and a weak engine brake acts on the hybrid vehicle. The output torque TOUT is determined depending on the magnitude of the engine brake torque.

Figure 10:
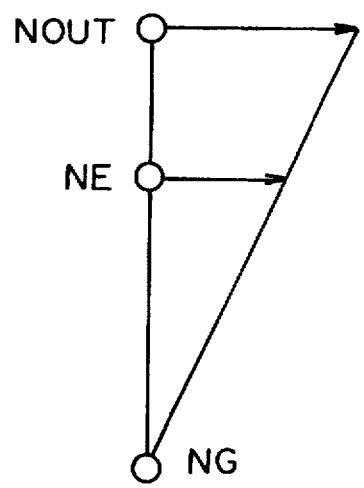
FIG. 10 is a third velocity diagram in the first embodiment of the present invention when the internal combustion engine is in the non-driving mode.

Next, an explanation will be given, with reference to FIGS. 10 and 11, of the operation of the hybrid vehicle in a state in which the internal combustion engine 11 is brought into the non-driving state and the generator/motor 16 is controlled to increase the reaction force, while the hybrid vehicle is traveling.

In this case, the electric motor 25 (FIG. 2) receives the rotation of the drive wheels 41 and generates a regenerative current, the ring gear R (FIG. 1) also receives the rotation of the drive wheels 41 and rotates in the forward direction, and the generator/motor 16 is controlled such that the generator/motor rotational speed NG becomes zero, thereby stopping the sun gear S. Therefore, the generator/motor 16 does not generate electricity.

The internal combustion engine 11 is caused to rotate faster and the carrier CR is rotated in the forward direction. Accordingly, the output rotational speed NOUT and the engine rotational speed NE become positive, and the generator/motor rotational speed NG becomes zero, as shown in FIG. 10.

In this state, the rotor 21 of the generator/motor 16 can be selectively fixed to the casing 10 by operating the brake B.

Figure 11:
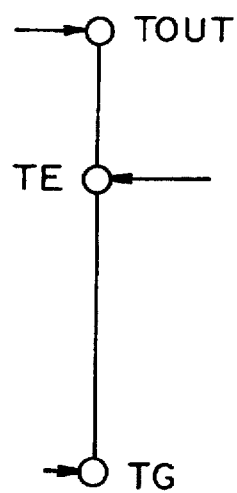
FIG. 11 is a third torque diagram in the first embodiment of the present invention when the internal combustion engine is in the non-driving state.

At this time, the engine torque TE act, in the leftward direction in FIG. 11, and acts on the planetary gear unit 13 as an engine brake torque having a magnitude greater than that in the state shown in FIG. 9. Accordingly, the output torque TOUT increases as the hybrid vehicle decelerates.

Figure 12:
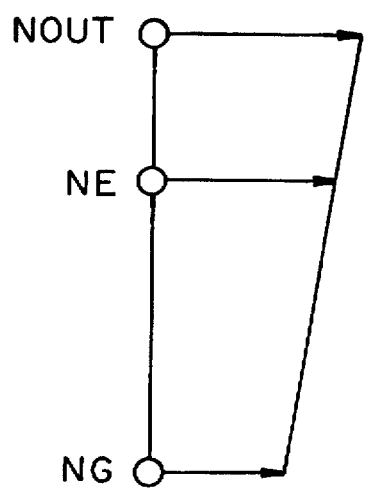
FIG. 12 is a fourth velocity diagram in the first embodiment of the present invention when the internal combustion engine is in the non-driving state.

Next, an explanation will be given, with reference to FIGS. 12–14, of the operation of the hybrid vehicle in which the internal combustion engine 11 is brought into the non-driving state when the hybrid vehicle is traveling, and the generator/motor 16 is controlled to increase the reaction force, i.e., to operate as an electric motor.

In this case, the electric motor 25 receives the rotation of the drive wheels 41 and generates a regenerative current. The ring gear R (FIG. 1) also-receives the rotation of the drive wheels 41 and rotates in the forward direction, and the generator/motor 16 is controlled to operate as an electric motor so that it rotates in the forward direction. Accordingly, the sun gear S is also rotated in the forward direction.

The internal combustion engine 11 is caused to rotate faster and the carrier CR is rotated in the forward direction. Accordingly, each of the output rotational speed NOUT, the engine rotational speed NE, and the generator/motor rotational speed NG becomes positive, as shown in FIG. 12.

Figure 13:
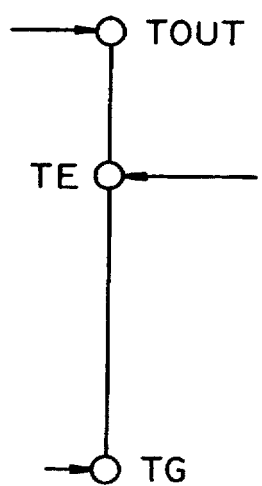
FIG. 13 is a fourth torque diagram in the first embodiment of the present invention when the internal combustion engine is in the non-driving state.

At this time, the engine torque TE acts in the leftward direction in FIG. 13, and acts on the planetary gear unit 13 as an engine brake torque having a magnitude greater than that in the state shown in FIG. 11. Accordingly, the output torque TOUT further increases.

Figure 14:
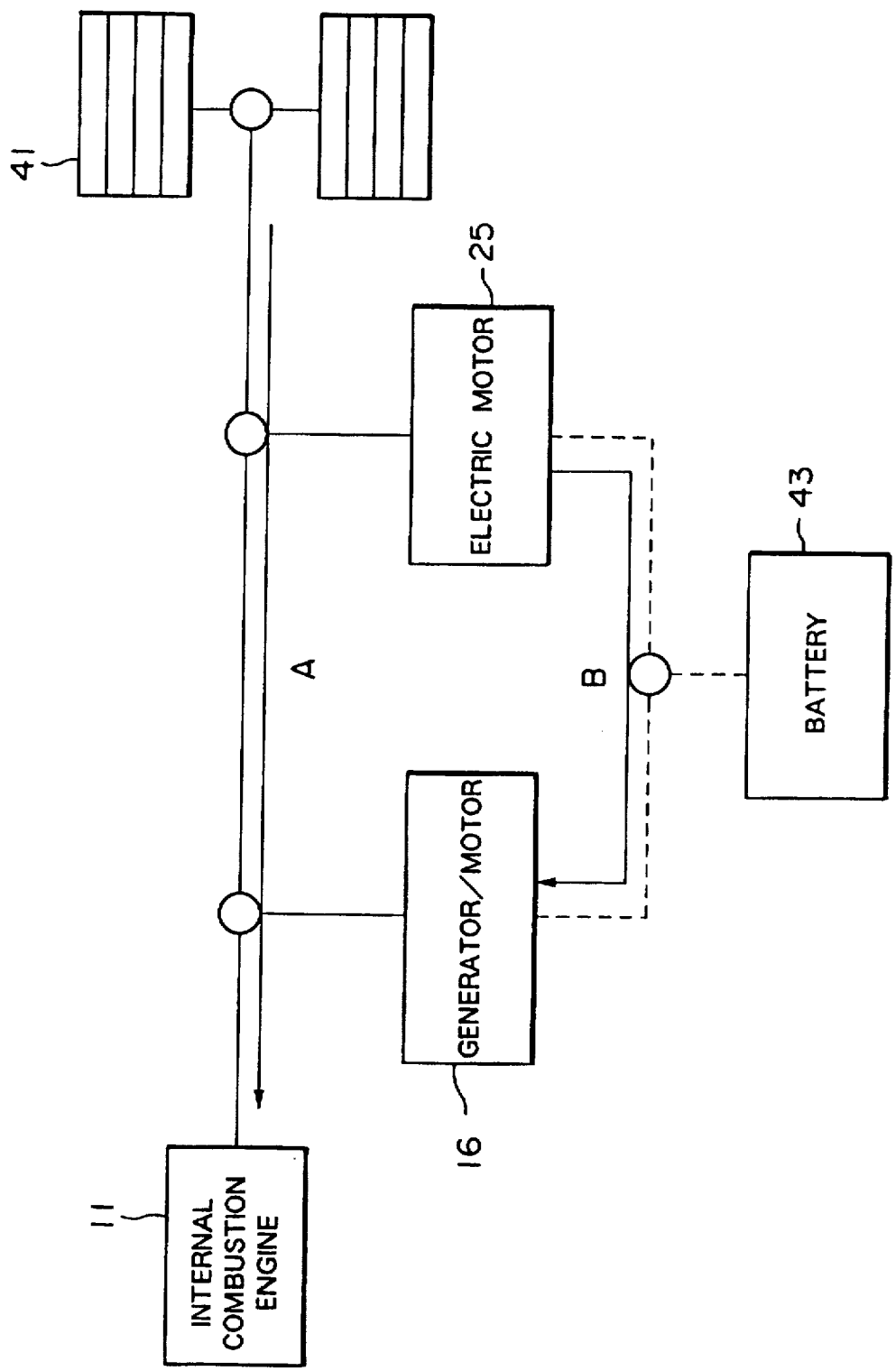
FIG. 14 is a diagram showing the flow of energy in the first embodiment of the present invention.

As described above, when the generator/motor 16 is used as a generator, a torque is transmitted from the drive wheels 41 to the internal combustion engine 11, as indicated by arrow A in FIG. 14, so that the internal combustion engine 11 is rotated to generate an engine brake torque. As a result, a decelerating force is mechanically applied to the hybrid vehicle. When the generator/motor 16 is used as an electric motor, not only a torque is transmitted from the drive wheels 41 to the internal combustion engine 11, as indicated by arrow A in FIG. 14, but also power is consumed by the generator/motor 16. Since excessive regenerative current is consumed by the generator/motor 16, as indicated by arrow B in FIG. 14, the electric motor 25 increases the regenerative current accordingly. As a result, the deceleration force is increased further. Numeral 43 denotes a battery.

In this case, since the excessive regenerative current can be consumed by the internal combustion engine 11 and the generator/motor 16, a radiating resistor becomes unnecessary so that the weight and size of the hybrid vehicle can be decreased.

Since the generator/motor 16 is controlled in accordance with the difference between the regenerative current and the chargeable amount, the deceleration force can be applied to the hybrid vehicle without detriment to the drive quality thereof, even when the chargeable amount of the battery varies depending with changing conditions of the battery such as the battery voltage, the battery residual amount, and the temperature of the battery.

When an engine brake torque is generated, the internal combustion engine 11 serves as a load so that heat is generated in the internal combustion engine. However, since an unillustrated cooling unit such as a radiator is connected to the internal combustion engine 11 and the heat can be discharged from the cooling unit even when the hybrid vehicle travels on a long downhill road, it is unnecessary to provide a separate cooling unit.

Also, since the engine rotational speed NE can be controlled by controlling the generator/motor rotational speed NG, the engine brake torque can be made variable.

Next, the operation of the hybrid vehicle having the above-described structure will be described with reference to the flowchart of FIG. 15.

Step S1: The brake depression amount $\theta_B$ (%) of the brake pedal 53 (FIG. 2), the motor rotational speed $N_m$ (rpm), the generator/motor rotational speed NG (rpm), the shift position $P_{OS}$ selected by the shift lever 54, and the battery residual amount $S_{OC}$ (%) detected by the chargeable amount detecting unit 44 are input.

Step S2: Unillustrated decelerating operation detecting means detects whether a decelerating operation is performed by depressing the brake pedal 53, i.e., whether the brake signal is ON. When the brake signal is ON, the process moves to step S3. When the brake signal is OFF, the process moves to step S4.

Step S3: Process for a first case is performed.

Step S4: The decelerating operation detecting means detects whether a decelerating operation is performed by operating the shift lever 54, i.e., it is judged based on the shift position signal whether a shift position $P_{OS}$ is selected to range 2, L or D. When the shift position $P_{OS}$ is the range 2 or L in which engine brake is used, the process moves to step S5. When the shift position $P_{OS}$ is the range D, the process returns to the main routine.

Step S5: Process for a second case is performed.

Next, the process for the first case in step S3 of FIG. 15 will be described with reference to FIGS. 16–21.

Figure 18:
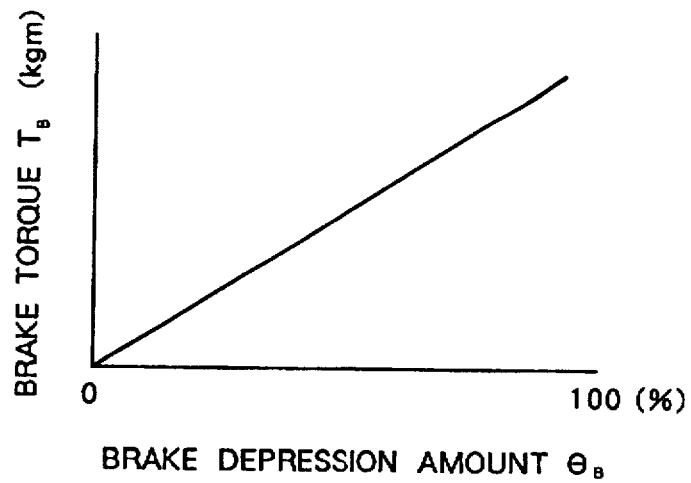
FIG. 18 shows a first map used in the first embodiment of the present invention.
Figure 19:
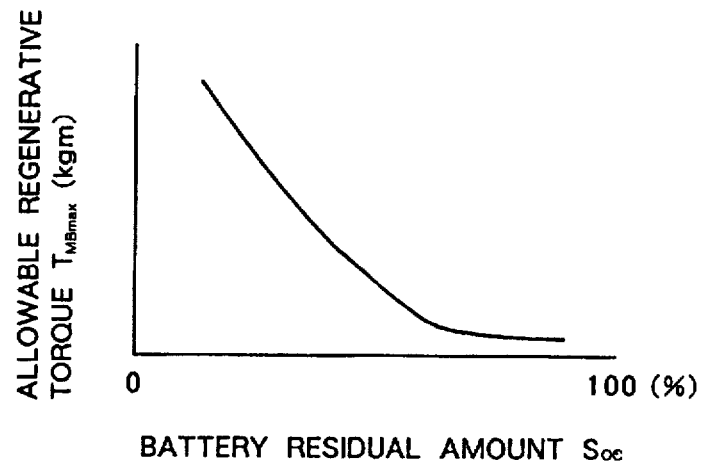
FIG. 19 shows a second map used in the first embodiment of the present invention.
Figure 20:
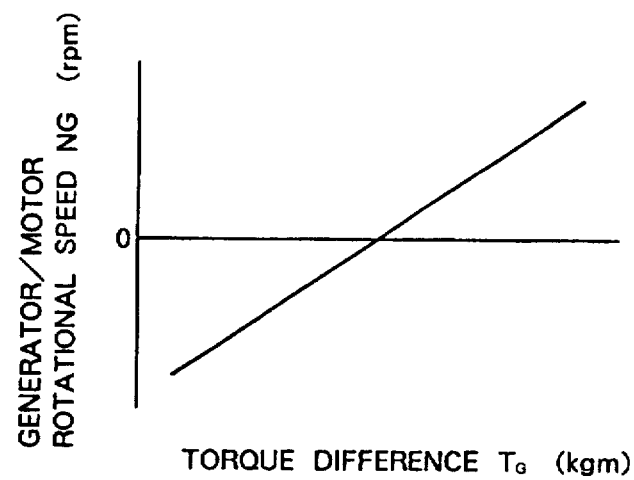
FIG. 20 shows a third map used in the first embodiment of the present invention.
Figure 21:
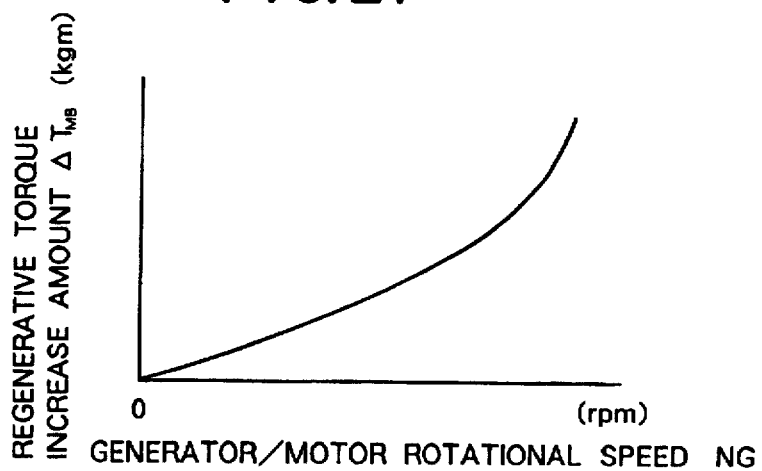
FIG. 21 shows a fourth map used in the first embodiment of the present invention.

In FIG. 18, the abscissa represents the brake depression amount $\theta_B$ while the ordinate represents the brake torque $T_B$. In FIG. 19, the abscissa represents the battery residual amount $S_{OC}$ while the ordinate represents an allowable regenerative torque $T_{MBmax}$. In FIG. 20, the abscissa represents the torque difference $T_G$ while the ordinate represents the generator/motor rotational speed NG. In FIG. 21, the abscissa represents the generator/motor rotational speed NG while the ordinate represents a regenerative torque increase amount $\Delta T_{MB}$.

Step S3-1: The engine controller 46 (FIG. 2) brings the internal combustion engine 11 into the non-driving state.

Step S3-2: The generator/motor controller 47 obtains a brake torque TB from the brake depression amount $\theta_B$ with reference to the first maps shown in FIG. 18. Since the brake torque $T_B$ varies depending on the degree of deceleration of the hybrid vehicle, it represents the amount of regenerative current generated by the electric motor 25.

Step S3-3: The allowable limit of the regenerative torque $T_{MB}$ generated by the electric motor 25, i. e., the allowable regenerative torque $T_{MBmax}$ indicating the amount of the regenerative current which can be supplied to the battery 43 is obtained from the battery residual amount $S_{OC}$ with reference to the second map shown in FIG. 19. The allowable regenerative torque $T_{MBmax}$ varies depending on the chargeable amount.

Step S3-4: It is judged whether the brake torque $T_B$ is smaller than the allowable regenerative torque $T_{MBmax}$, i.e., whether the electric motor 25 can produce an excessive regenerative current. When the brake torque $T_B$ is smaller than the allowable regenerative torque $T_{MBmax}$, the process moves to step S3-5. When the brake torque $T_B$ is equal to or greater than the allowable regenerative torque $T_{MBmax}$, the process moves to step S3-6.

Step S3-5: Since the battery 43 still has sufficient accumulation capacity, the brake torque $T_B$ is entirely used as the regenerative torque $T_{MB}$ for the electric motor 25 to generate a regenerative current. After that, the process returns to the base routine.

Step S3-6: Since the battery 43 does not have sufficient accumulation capacity, the regenerative torque $T_{MB}$ is made equal to the allowable regenerative torque $T_{MBmax}$.

Step S3-7: The difference between the brake torque $T_B$ and the regenerative torque $T_{MB}$ is calculated and is stored as the torque difference $T_G$.

Step S3-8: The generator/motor rotational speed NG is obtained from the torque difference $T_G$ with reference to the third map shown in FIG. 20.

Step S3-9: It is judged whether the generator/motor rotational speed NG is negative, i.e., whether the generator/motor 16 acts as a generator. When the generator/motor rotational speed NG is negative, the process returns to the base routine. When the generator/motor rotational speed NG is positive, the process moves to step S3-10. As described above, when the battery 43 does not have sufficient accumulation capacity, the whole amount of the regenerative current cannot be accumulated in the battery. In this case, the amount of the regenerative current which can be accumulated in the battery 43 is supplied to the battery 43. Accordingly, a deceleration force generates engine brake torque by compulsorily rotating the internal combustion engine 11.

Step S3-10: Since the generator/motor 16 operates as an electric motor when the generator/motor rotational speed NG is positive, the regenerative torque $T_{MB}$ of the electric motor 25 can be increased. Therefore, the regenerative torque increase amount $\Delta T_{MB}$ of the electric motor 25 is obtained from the generator/motor rotational speed NG with reference to the fourth map shown in FIG. 21.

Step S3-11: The regenerative torque $T_{MB}$ of the electric motor 25 is increased by the regenerative torque increase amount $\Delta T_{MB}$.

The first through fourth maps are prepared for each of a plurality of reference vehicle speeds. When the present vehicle speed is between two reference vehicle speeds, the value for the present vehicle speed is obtained by interpolating the values obtained for the two reference vehicle speeds.

Next, the process for the second case in step S5 of FIG. 15 will be described with reference to FIGS. 22–23.

Figure 22:
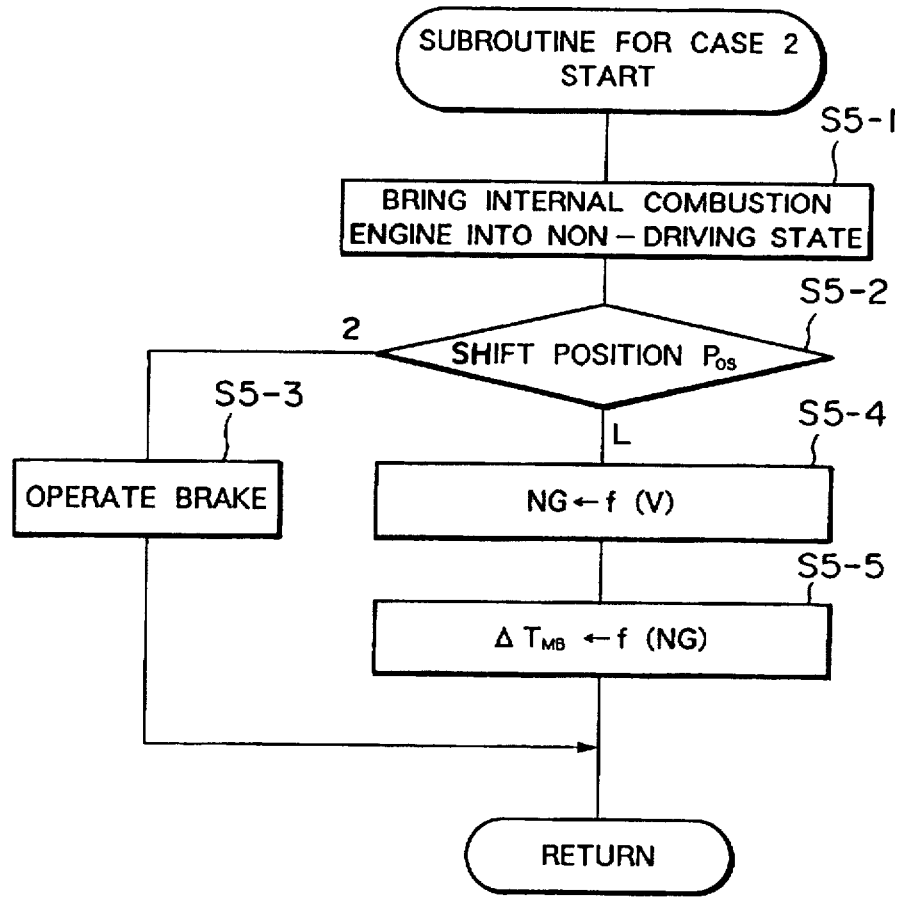
FIG. 22 is a flowchart showing a subroutine for a second case in the first embodiment of the present invention.
Figure 23:
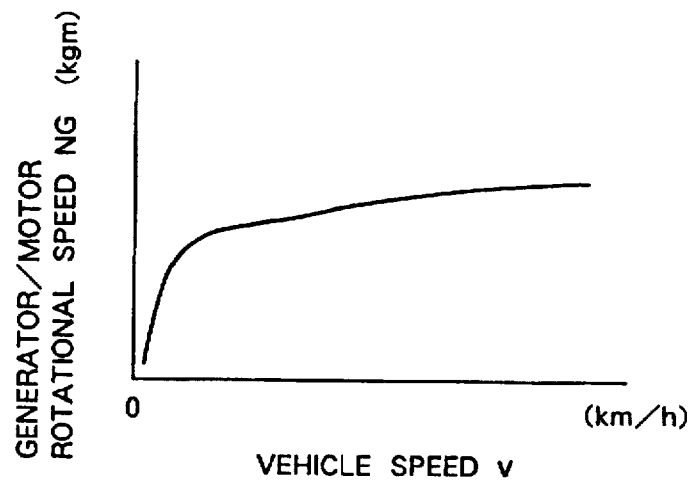
FIG. 23 shows a fifth map used in the first embodiment of the present invention.

FIG. 22 is a flowchart showing a subroutine for the second case in the first embodiment of the present invention, and FIG. 23 shows a fifth map used in the first embodiment of the present invention. In FIG. 23, the abscissa represents the vehicle speed v while the ordinate represents the generator/motor rotational speed NG.

Step S5-1: The engine controller 46 (FIG. 2) brings the internal combustion engine 11 into the non-driving state.

Step S5-2: It is judged based on the shift position signal whether the shift position $P_{OS}$ selected is the range 2 or L. When the selected shift position $P_{OS}$ is the range 2, the process moves to step S5-3. When the selected shift position $P_{OS}$ is the range L, the process moves to step S5-4.

Step S5-3: The brake actuator 48 operates the brake B of the generator/motor 16 to produce an engine brake, thereby producing decelerating force.

Step S5-4: To generate a large deceleration force, the generator/motor 16 is operated as an electric motor. The generator/motor rotational speed NG is obtained from the vehicle speed v with reference to the fifth map shown in FIG. 23.

Step S5-5: The regenerative torque increase amount $\Delta T_{MB}$ is obtained from the generator/motor rotational speed NG with reference to the fourth map shown in FIG. 21.

Next, a second embodiment of the present invention will be described with reference to FIG. 24.

Figure 24:
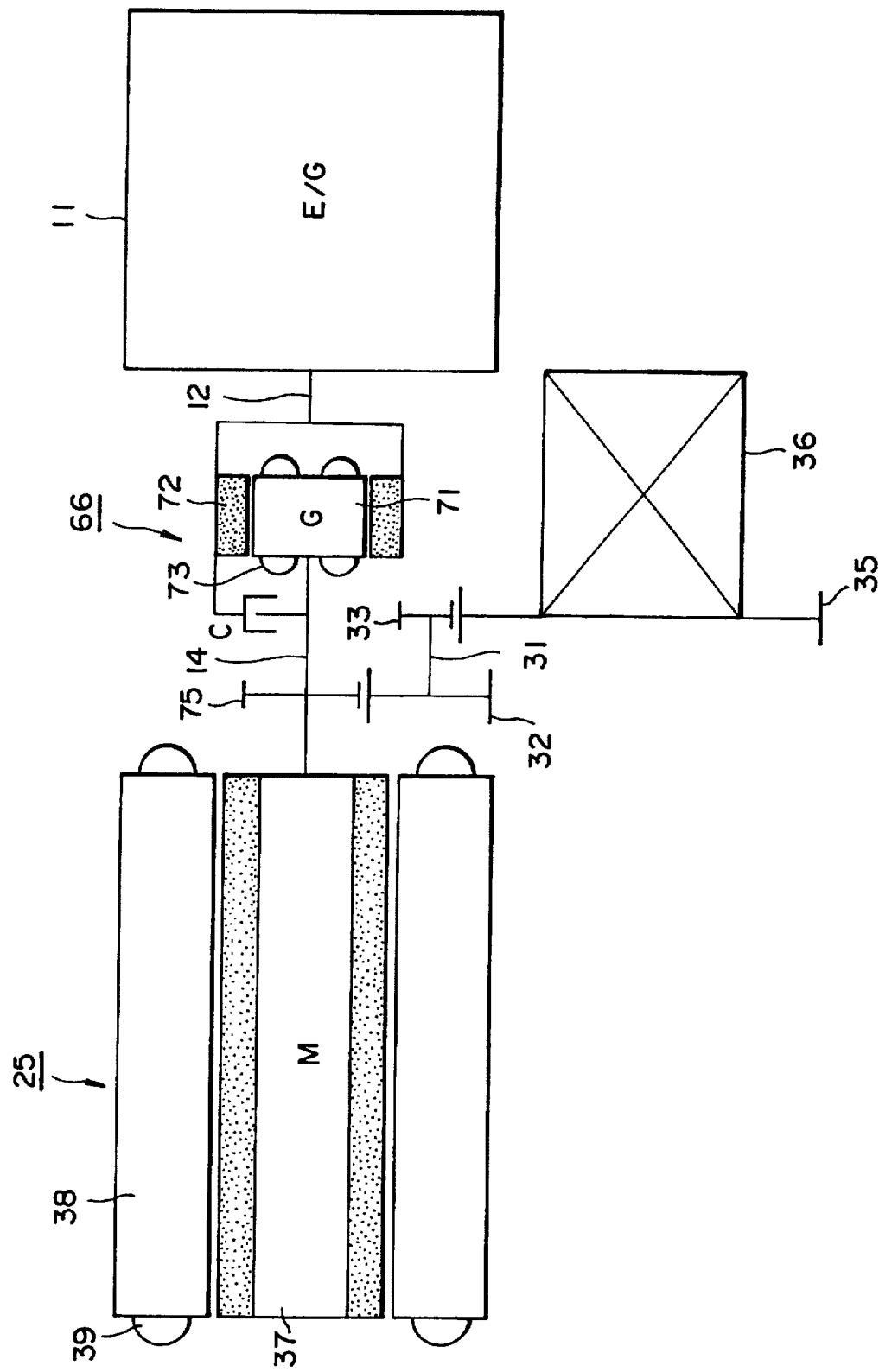
FIG. 24 is a schematic view of a drive apparatus of a hybrid vehicle according to the second embodiment of the present invention.

In FIG. 24, numeral 11 denotes an internal combustion engine (E/G) disposed on a first axis, numeral 12 denotes an output shaft which is disposed on the first axis and outputs the rotation generated by operating the internal combustion engine 11, numeral 66 denotes a generator/motor serving as an electromechanical unit which is disposed on the first axis and connected to the output shaft 12, numeral 14 denotes an output shaft which is disposed on the first axis and connected to the generator/motor 66, and numeral 75 denotes a counter drive gear which is disposed on the first axis and fixed to the output shaft 14.

The generator/motor 66 has a rotor 71 which is disposed for free rotation, a stator 72 which is rotatably disposed and surrounds the rotor 71, and a winding 73 wound on the rotor 71. In the present embodiment, the stator 72 is not fixed to a casing, but is rotated together with the output shaft 12. The rotor 71 is connected to the output shaft 14, and a clutch C is disposed to establish and break the mechanical connection between the rotor 71 and the stator 72. The generator/motor 66 generates electrical power by using the rotation transmitted through the output shaft 12. The winding 73 is connected to the battery 43 (FIG. 2) so as to supply the battery 43 with current for accumulation. An engine brake effect can be obtained by bringing the clutch C into an engaged state.

Numeral 25 denotes an electric motor (M) which is disposed on the first axis and receives current from the battery 43 to generate rotation. The electric motor 25 includes a rotor 37 which is fixed to the output shaft 14 and is rotatably disposed, a stator 38 disposed to surround the rotor 37, and a winding 39 wound on the stator 38. The electric motor 25 generates a torque by using current supplied to the winding 39. For this purpose, the winding 39 is connected to the battery 43 to receive current therefrom. Also, winding 39 receives the rotation from the drive wheels 41 and generates a regenerative current, which is then supplied to the battery 43 to be accumulated therein.

To rotate the drive wheels 41 in the same direction as the internal combustion engine 11, a counter shaft 31 is disposed on a second axis parallel to the first axis, and a counter driven gear 32 is fixed to the counter shaft 31. The counter driven gear 32 is meshed with the counter drive gear 75, so that the rotation of the counter drive gear 75, is transmitted to the counter driven gear 32 while its rotational direction is inverted.

Further, a differential pinion gear 33 is fixed to the counter shaft 31. The differential pinion gear 33 has teeth the number of which is fewer than that of the teeth of the counter driven gear 32.

A differential ring gear 35 is disposed on a third axis parallel to the first and second axes, and the differential ring gear 35 is meshed with the differential pinion gear 33. A differential unit 36 is coupled to the differential ring gear 35. As a result, the rotation transmitted to the differential ring gear 35 is transmitted to the drive wheels 41 via the differential unit 36 while providing a differential action.

In the present embodiment, when the generator/motor 66 is used as a generator, the internal combustion engine 11 is rotated to generate an engine brake torque so that a decelerating force can be applied to the hybrid vehicle. When the generator/motor 66 is used as an electric motor, the internal combustion engine 11 is rotated to generate an engine brake torque, and the generator/motor 66 consumes electrical power. Since excessive regenerative current is consumed by the generator/motor 66, the electric motor 25 increases the regenerative current accordingly. As a result, the decelerating force is further increased.

In the present embodiment, a clutch actuator is provided in place of the brake actuator 48 shown in FIG. 2, and the clutch G is connected to the clutch actuator.

Figure 15:
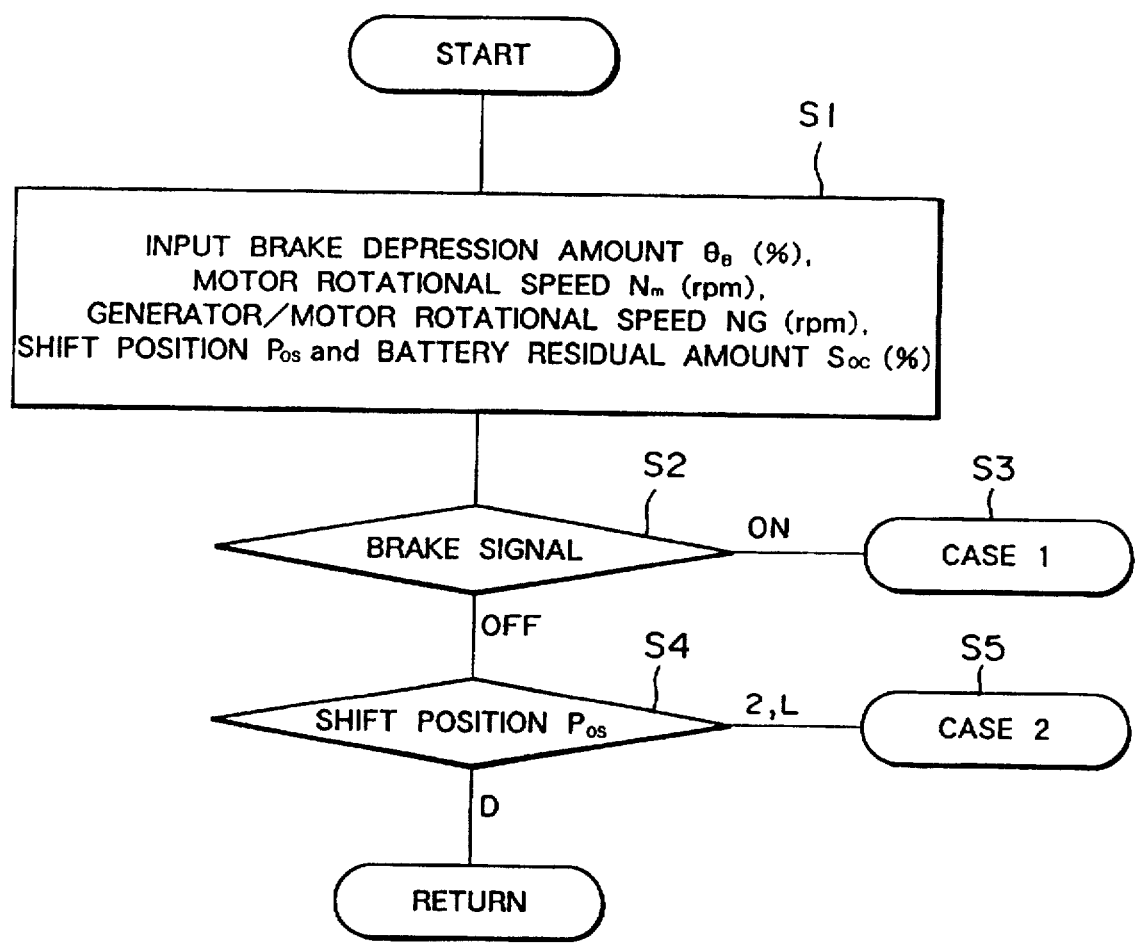
FIG. 15 is a flowchart of a main control routine for operation of the hybrid vehicle according to the first embodiment of the present invention.
Figure 16:
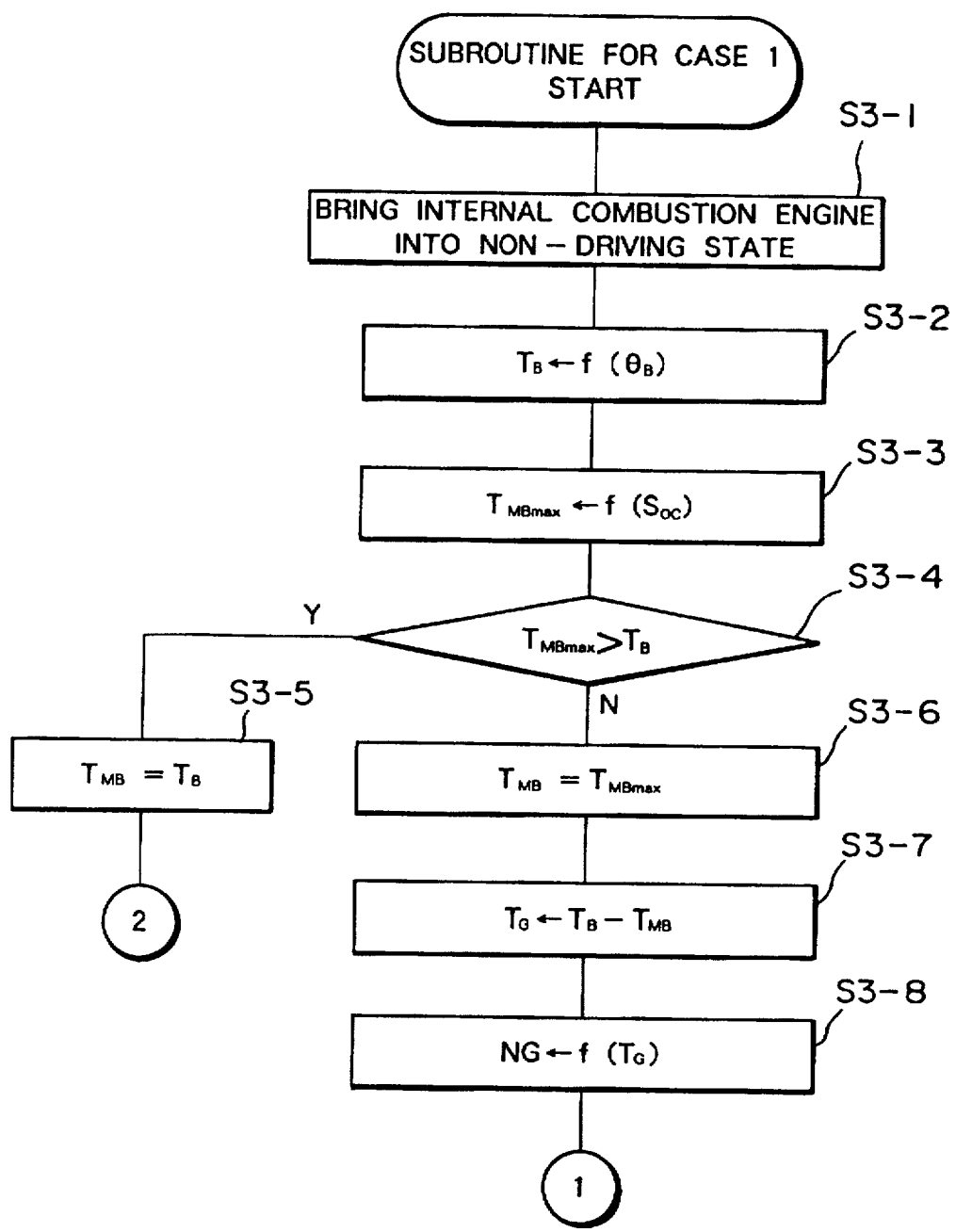
FIG. 16 is a partial flowchart of a subroutine for a first case in the first embodiment of the present invention.
Figure 17:
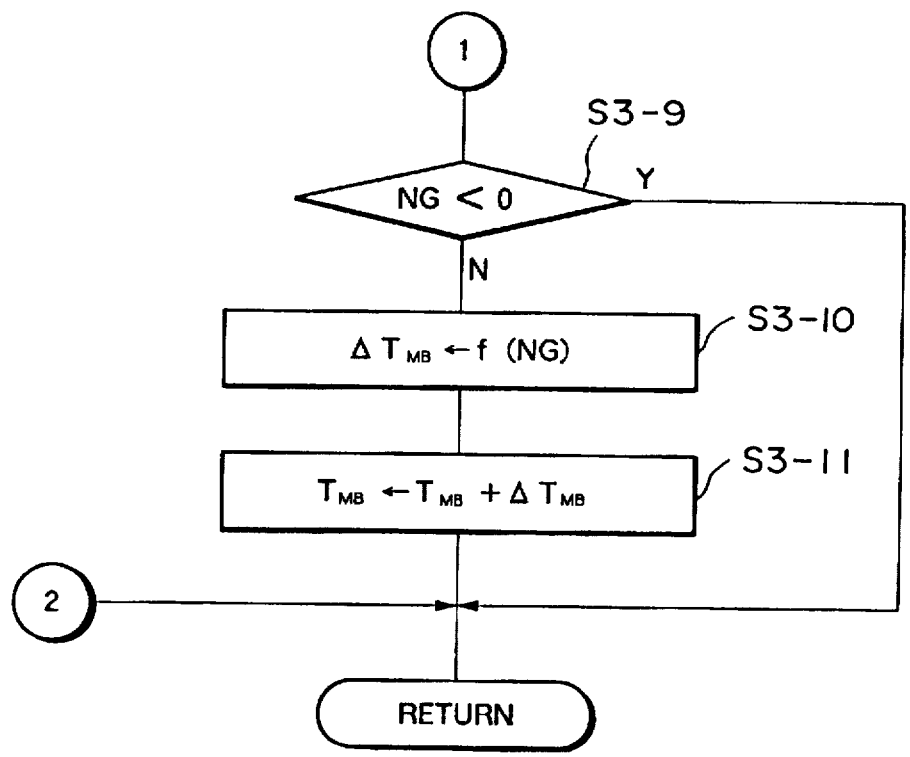
FIG. 17 is a continuation of the flowchart of FIG. 16.

In the process for the second case shown in FIG. 15 of the present embodiment, a constant decelerating force is generated in accordance with the shift position $P_{OS}$. However, it is possible to set the generator/motor rotational speed NG in accordance with the chargeable amount of the battery 43 as in the process for the first case.

The present invention is not limited to the above-described embodiments. Numerous modifications and variations of the present invention are possible in light of the spirit of the present invention, and they are not excluded from the scope of the present invention.

What is claimed is:

1. A hybrid vehicle propelled by drive wheels and comprising:
   (a) an internal combustion engine for generating torque in a driving state and for operating in a non-driving state;
   (b) a drive shaft for, in the driving state, transmitting the generated torque from the engine to the drive wheels;
   (c) an electromechanical unit, which is connected to said internal combustion engine for rotating said internal combustion engine, while operating in the non-driving state, to provide engine braking;
   (d) an electric motor which, in a first mode, is driven by current supplied thereto and, in a second mode, receives torque from said drive wheels to produce a regenerative current;
   (e) decelerating operation detecting means for detecting that a decelerating operation has been performed;
   (f) a differential gear unit having at least a first gear element connected to said electromechanical unit, a second gear element connected to said drive shaft and a third gear element connected to said internal combustion engine, whereby said electromechanical unit is connected to said internal combustion engine through said differential gear unit;
   (c) an engine controller for bringing said internal combustion engine into the non-driving state responsive to detection by said decelerating operation detecting means that a decelerating operation has been performed; and
   (h) electromechanical unit control means for controlling said electromechanical unit when said internal combustion engine is in the non-driving state.

2. A hybrid vehicle according to claim 1, further comprising:
   (i) electricity storage means for storing electricity; and
   (j) a chargeable amount detecting unit for detecting a chargeable amount for said electricity storage means; and
   wherein said electromechanical unit control means compares an electricity accumulation amount corresponding to the regenerative current generated by said electric motor with said chargeable amount, and responsive to the electricity accumulation amount exceeding the chargeable amount, controls said electromechanical unit to rotate said internal combustion engine.

3. A hybrid vehicle according to claim 1, wherein said decelerating operation detecting means detects depression of a brake pedal.

4. A hybrid vehicle according to claim 1, wherein said decelerating operation detecting means detects operation of a shift lever.

5. A hybrid vehicle according to claim 4, wherein said electromechanical unit control means controls rotation of said internal combustion engine by controlling said electromechanical means responsive to vehicle speed.

6. A hybrid vehicle according to claim 1, wherein said electromechanical unit comprises a stator, a rotor, and a brake which is disposed between the rotor and a casing to selectively fix the rotor.

7. A hybrid vehicle according to claim 5, wherein said electromechanical unit control means operates said brake to generate an engine brake torque.

8. A hybrid vehicle according to claim 1, further comprising electricity storage means for storing electricity, wherein said electromechanical unit control means controls the rotation of said internal combustion engine by controlling said electromechanical unit based on a difference between an allowable regenerative torque and an engine braking torque, said allowable regenerative torque corresponding to the amount of the regenerative current which can be supplied to said electricity storage means.

9. A hybrid vehicle according to claim 1, wherein said electromechanical unit is operable as a generator for generating electricity.

10. A hybrid vehicle according to claim 1, wherein said engine controller establishes the non-driving state by turning off an ignition switch for said internal combustion engine.

11. A hybrid vehicle according to claim 1, wherein said engine controller establishes the non-driving state by operating said internal combustion engine at idle.

12. A hybrid vehicle propelled by drive wheels and comprising:

(a) an internal combustion engine for transmitting torque to the drive wheels in a driving state and for operating in a non-driving state;

(b) an electromechanical unit, which is connected to said internal combustion engine for rotating said internal combustion engine, while operating in the non-driving state, to produce engine braking, said electromechanical unit comprising a rotor, a stator and a coil, one of said rotor and said stator being connected to said engine for rotation therewith;

(c) an output shaft connected to said internal combustion engine via said electromechanical unit;

(d) an electric motor, which is connected to said output shaft and to the other of said rotor and said stator for rotation therewith, for, in a first mode, producing torque responsive to a supply current and, in a second mode, producing a regenerative current responsive to deceleration of the vehicle;

(e) a decelerating operation detecting means for detecting that a decelerating operation has been performed;

(f) an engine controller for changing said internal combustion engine into the non-driving state responsive to detection of a decelerating operation by said decelerating operation detecting means; and (g) electromechanical unit control means for controlling said electromechanical unit to cause said electromechanical unit to rotate said internal combustion engine while in the non-driving state to provide engine braking.

13. A hybrid vehicle according to claim 12, wherein said decelerating operation detecting means detects depression of a brake pedal.

14. A hybrid vehicle according to claim 12, wherein said decelerating operation detecting means detects operation of a shift lever.

15. A hybrid vehicle according to claim 14, wherein said electromechanical unit control means controls engine braking by said internal combustion engine in said non-driving state by controlling said electromechanical unit responsive to vehicle speed.

16. A hybrid vehicle according to claim 12, wherein said electromechanical unit further comprises a clutch which is disposed between the stator and the rotor to selectively establish a mechanical connection between the stator and the rotor.

17. A hybrid vehicle according to claim 16, in which said electromechanical unit control means operates said clutch to generate an engine brake torque.

18. A hybrid vehicle according to claim 12, further comprising:

(h) electricity storage means for storing electricity; and (i) a chargeable amount detecting unit for detecting a chargeable amount for said electricity storage means; and wherein said electromechanical unit control means compares an electricity accumulation amount corresponding to the-regenerative current generated by said electric motor with said chargeable amount, and responsive to the electricity accumulation amount exceeding the chargeable amount, controls said electromechanical unit to rotate said internal combustion engine.

19. A hybrid vehicle according to claim 18, wherein said electromechanical unit control means controls said electromechanical unit based on a difference between an allowable regenerative torque and a brake torque, said allowable regenerative torque corresponding to the amount of the regenerative current which can be accumulated in said electricity storage means.

20. A hybrid vehicle according to claim 18, wherein said electromechanical unit is operable as a generator for generating electricity.

21. A hybrid vehicle according to claim 12, wherein said engine controller establishes the non-driving state by operating said internal combustion engine at idle.

* * * * *

UNITED STATES PATENT AND TRADEMARK OFFICE
CERTIFICATE OF CORRECTION

PATENT NO. : 5,791,427
DATED : August 11, 1998
INVENTOR(S) : Kozo YAMAGUCHI

It is certified that error appears in the above-indentified patent and that said Letters Patent is hereby corrected as shown below:

Col. 14, line 10, delete "(c)" and insert --(g)--.

Col. 16, line 20, delete "the-regenerative" and insert --the regenerative--.

Signed and Sealed this

Twenty-second Day of June, 1999

Attest:

Q. TODD DICKINSON

*Attesting Officer*   Acting Commissioner of Patents and Trademarks